United States Patent Office 3,337,489
Patented Aug. 22, 1967

3,337,489
FLEXIBLE OXYGEN CONTAINING POLYBUTADIENE SURFACE COATING COMPOSITION
Neville Leverne Cull, Baker, and Joseph Kern Mertzweiller, Baton Rouge, La., assignors to Esso Research and Engineering Company, a corporation of Delaware
No Drawing. Filed Nov. 26, 1963, Ser. No. 326,253
12 Claims. (Cl. 260—30.4)

This invention relates to novel compositions of matter comprising oxidized butadiene polymers blended with hydroformylated butadiene polymers. In one aspect it relates to producing flexible, high-impact-strength oxidized polybutadiene or oxidized polybutadiene copolymers by incorporating minor proportions of hydroformylated polybutadiene or hydroformylated polybutadiene copolymers therein. In another aspect it relates to producing blends of relatively lower oxygen content oxidized butadiene polymers with hydroxylated butadiene polymers employing solvents as hereinlater set forth.

It is known that certain of the film-forming properties of liquid polymers of conjugated diolefins such as butadiene or copolymers of butadiene and styrene can be improved by the treatment of these polymers with air or oxygen at elevated temperatures in the presence of catalysts. The treatment is best conducted by blowing the polymer with air or oxygen at temperatures between 70 and 300° F., while said polymer is dissolved in a suitable solvent. The solvents found useful include paraffin hydrocarbons, aromatic hydrocarbons, and their mixtures as well as various oxygenated solvents such as alcohols, ketones, ethers, and the like. The polymers which result from the blowing treatment disclosed above are referred to herein as oxidized polybutadiene or oxidized polybutadiene copolymers. While the treatment of these polymers with air or oxygen at elevated temperatures result in polymeric products with improved film-forming properties, it is found, however, that certain undesirable properties manifest themselves in the films which are formed therefrom. For example, it is found that as the oxygen content of the oxidized polybutadiene increases, the flexibility and adhesion, as measured by reverse impact (inch/pounds) and mandrel flexibility, greatly decreases to the detriment of films formed from said oxidized polybutadiene. Thus, one of the major disadvantages of oxidized polybutadiene has been that the higher the oxygen level thereof is raised, the more brittle the resulting film becomes.

It is, therefore, an object of this invention to provide oxidized polybutadiene or oxidized polybutadiene copolymers of superior film-forming properties.

It is another object of this invention to provide a means of improving the flexibility and adhesive properties of oxidized polybutadiene or oxidized polybutadiene copolymers without adversely affecting the hardness of films made from said polymeric material.

Other objects, advantages, and features of this invention should become apparent from the following detailed description of the invention.

In accordance with the present invention, it has been discovered that novel film-forming compositions of greatly improved physical properties, that is, improvements in flexibility and adhesion, can be produced by blending oxidized polybutadiene or oxidized polybutadiene copolymers with the polymers which result from the hydroformylation of polybutadiene or polybutadiene copolymers. Further, this improved effect is, surprisingly, more marked when the oxygen content of butadiene polymers is higher. Such improvement is accomplished by blending from about 70 to 95 parts by weight of said oxidized polybutadiene or oxidized polybutadiene copolymers with 5 to 30 parts by weight of hydroformylated polybutadiene or polybutadiene copolymers.

While the present invention as set forth herein is directed to butadiene polymers and copolymers, in its broad sense, the basic polymeric materials to which the present invention is applicable are polymers of butadiene, isoprene, dimethyl butadiene, piperylene, methylpentadiene, or other conjugated diolefins having 4 to 6 carbon atoms per molecule. Instead of polymerizing any of the aforesaid diolefins alone, they may also be copolymerized in admixtures with each other or in admixtures with minor amounts of ethylenically unsaturated monomers copolymerizable therewith, e.g., with 0 to 40% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such polymers may be advantageously prepared by mass polymerization either in the presence of a hydrocarbon soluble peroxide catalyst, such as benzoyl peroxide or cumene hydroperoxide, or in the presence of metallic sodium or other alkali metals or metal alkyls when the monomers consist of a diolefin or of a mixture of a diolefin with a styrene compound. Under proper conditions, the emulsion polymerization technique may also be adapted to the preparation of the polymers to which the present invention is applicable. These polymerization techniques should be understood not to comprise any portion of this invention, however, suitable polymerization methods are illustrated below. Throughout the present description it will be understood that all properties are expressed on a weight basis unless otherwise specified.

For example, 100 parts of butadiene-1,3 50 parts of straight run mineral spirits boiling between 150 and 200° C. (Varsol), 3 parts t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content with mineral spirits. The non-volatile constituent, which is the oily polymer of butadiene, has a molecular weight between 1,000 and 10,000 preferably between 2,000 and 5,000. It will be understood, of course, that the foregoing procedure is only illustrative and that it can be modified in many ways, particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc.

An alternative polymerization method using sodium as catalyst is illustrative as follows: 80 parts of butadiene-1, 3, 20 parts of styrene, 200 parts of straight-run mineral spirits boiling between 150 and 200° C., 40 parts of dioxane, 0.2 part of isopropanol, and 1.5 parts of finely dispersed sodium are heated to about 50° C. in a closed reactor provided with an agitator. Complete conversion is obtained in about 4.5 hours, whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–100% non-volatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60 and 200° C., e.g., butane, benzene, xylene, naphtha, cyclohexane, and the like. The diluents are usually used in amounts ranging from 50 to 500 parts per 100 parts of monomer. The reaction temperature may vary between about 40° C. and 100° C., preferably around 65 to 85° C. As a catalyst, 0.1 to 10 parts of dispersed metallic sodium is used per 100 parts of monomers, sodium particle sizes below 100 microns being particularly effective.

A particularly suitable process for the preparation of the polymer oil in accordance with this synthesis is the multi-stage continuous process described and claimed in Ser. No. 485,392, filed Feb. 2, 1955 now U.S. Patent No. 2,849,510, in the name of Stanley E. Jaros et al. The disclosures of this application are incorporated herein by reference.

The polymers produced by the above process have molecular weights up to 10,000 and viscosities up to 22 poises at 50% N.V.M. and are pale yellow to colorless liquids.

The above-described liquid polymers of diolefins, e.g., polybutadiene or copolymers of diolefins with vinyl aromatic hydrocarbons, e.g., polybutadiene-styrene copolymers are suitable as starting materials in the preparation of both the oxidized polymeric material, as well as the hydroformylated polymeric material from which the blends of this invention are prepared.

Illustrative of the preparation of the oxidized polymeric material which falls within the purview of this invention, the above described liquid polymers of diolefins or copolymers of diolefins with vinyl aromatic hydrocarbons are blown with air or oxygen at a temperature of 20 to 150° C., preferably 90 to 120° C., in the presence of an aromatic hydrocarbon solvent having a kauri-butanol value of at least 40, such as benzene, toluene, ortho, meta, and para xylene, or mixtures thereof, or petroleum fractions having a high kauri-butanol value, such as Solvesso 100 (boiling 157–177° C. and having a kauri-butanol value of 98–100) and Solvesso 150 (boiling 185–215° C. and having a kauri-butanol value of 98–100). The blowing is best carried out in the presence of catalysts including the organic salts of metals, such as the naphthenates, octoates, and other hydrocarbon soluble metal salts of cobalt, lead, iron, and manganese. These catalysts are used in amounts ranging from 0.001 to 1.0%. Peroxides, such as benzoyl peroxide and the like, may be added to reduce the induction period.

In the practice of one embodiment, a liquid polymer of a conjugated diolefin or a copolymer thereof with a vinyl aromatic hydrocarbon having a molecular weight of 5000 to 10,000 and a viscosity of 50% N.V.M. of between 0.3 poise and 22 poises, is diluted to the desired degree with a highly aromatic hydrocarbon solvent and oxidized by blowing air or oxygen into a tube or vertical tank containing the diluted mixture. The air or oxygen is introduced through a porous thimble or distributing plate near the bottom of the tank so as to afford maximum introduction of oxygen into the polymer-resin mixture. The blowing is continued for 1 hour up to 4 days.

All of the above conditions of temperature and time of reaction, ratio of reactants, degree of dilution, the specific solvent used, and the like will depend upon various factors, including the degree of oxidation desired and the exact nature and proportion of the polymer utilized. Therefore, it is not intended that the invention be limited by the specific conditions and examples herein set forth as it is intended to illustrate and not limit the invention.

The nature of the oxidized product employed as starting material in the blends of this invention depends on the proportion of the starting mixtures and the extent to which the oxidation is carried. This last factor in turn depends on time of oxidation, temperature, presence or absence of catalysts, specific solvent, etc. The amount of oxygen in the product will vary from a trace upwards, but usually varies from 10 to 30% or more.

In the prepartion of the second component of the blends of this invention, that is, the hydroformylated polymers which are applicable to the present invention, said liquid polymers of diolefins or copolymers of diolefins with vinyl aromatic hydrocarbons are hydroformylated in an inert hydrocarbon medium which may be either paraffinic or aromatic-type solvents, the latter being preferred. The polymer may also be hydroformylated without a diluent.

In general, the hydrocarbon soluble complexes used as catalysts to produce the polymers used in the present invention are oxo-type catalysts and can be broadly represented by the following formulae:

(1) 

and (2) 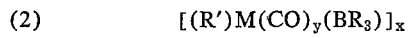

where in both Formula 1 and Formula 2 M is a transition metal selected from the group consisting of iron, cobalt, and rhodium, and preferably is cobalt; B is a Group V–A atom selected from the group consisting of phosphorus and arsenic, and preferably is phosphorus, R is an alkyl or alkoxy radical containing from 1 to about 20, and preferably 1 to 6 carbon atoms and in Formula 2 R′ represents a pi-bonded conjugated diolefin or allylic structure containing 3 to 6 carbon atoms; $x$ is 1 or 2 and $y$ is 1 or 2 with the proviso that when $x$ is 1, then $y$ is 2, and when $x$ is 2, then $y$ is 1.

The preferred forms of the complexes employed to produce the polymers employed, however, are represented by Formulae 3 and 4 as hereinbefore defined and which are set forth again as follows:

(3) 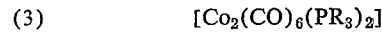

and (4) 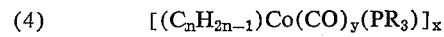

when in both Formulae 3 and 3, R is an alkyl or alkoxy radical containing from 1 to 6 carbon atoms, and in Formula 4, n is an integer from 3 to 6, x and y are as defined above.

Preparation of the complexes employed to produce the polymers of the present invention is described more fully in copending applications, Ser. No. 256,258 and Ser. No. 256,260 of Mertzweiller and Tenney, both filed Feb. 5, 1963. It should be understood, however, that the scope of the instant application should be in no way restricted in view of the above disclosures.

In broad terms, the hydroformylation reaction employed to produce the polymers employed in the present invention is effected by intimately contacting the diolefin polymer with carbon monoxide and hydrogen in the presence of a complex as hereinbefore described at hydroformylation temperature and pressure. The particular conditions selected to be employed will be dependent on the reaction product desired. For example, a wide variety of hydroformylated products may be produced by such practice which are characterized by at least three variables, viz. (1) hydroxyl group content, (2) carbonyl (aldehyde) group content, and (3) residual unsaturation content. Thus, control of the type of functionality and unsaturation may be achieved by the specific catalyst and reaction condition employed, i.e. temperature, $H_2$ and CO partial pressure, etc.

The reaction may be performed at pressures of from 100 to 3000 p.s.i.g., preferably 500 to 1500 p.s.i.g. Higher pressure, of course, may be employed if desired.

The reaction temperatures employed are in the range of from 200 to 500° F., preferably 300 to 400° F.

The reaction time is from 30 minutes to 5 hours, preferably 1 to 2 hours.

The molar ratio of hydrogen to carbon monoxide is not especially critical and may be varied to some extent. Suitably, the ratio employed will be at least 1:1. It has been found, however, that by increasing the $H_2/CO$ ratio to 3:1, the rate of reaction, as well as the yield of carbonylation product, may be increased. Although ratios up to 10:1 or higher may be employed, the ratio will normally be in the range of 1:1 to 3:1.

Ratios of complex to polymer to be hydroformylated may be varied from 0.1 to 10 weight percent, based on transition metal, or so as to achieve a homogeneous solution. Generally, larger quantities of catalyst complex will produce a higher reaction rate; however, an amount of complex so as to supply 2.5% by weight or less of cobalt based on the polymer is preferable, and from 0.01 to 0.2 weight percent of cobalt, based on polymer, is especially preferable for the process of the present invention.

It is within the ambit of the instant invention to provide for the use of a completely hydroxylated polymer, that is one containing 2–30 hydroxyl groups/molecule, with the oxidized polybutadiene or oxidized polybutadiene copolymers. Such hydroxylated polymer may be prepared by utilizing a two-stage process in which process conditions in the first stage are set to maximize oxonation and minimize hydrogenation of the starting polymer, followed by a second stage operating under hydrogenation conditions. Hence, in accordance with the present invention, such hydroxylated polymers are produced in a two-stage process which comprises reacting, in a first stage, an unsaturated hydrocarbon compound as hereinbefore described with carbon monoxide and hydrogen in the presence of a hydrocarbon soluble "phosphine" complex, that is, for example, one having the formulae:

(5)  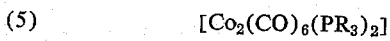
and (6)  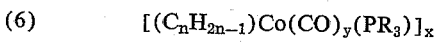

where R is an alkyl radical containing about 1 to 6 carbon atoms, n is an integer of from 3 to 6 and x is 1 or 2 and y is 1 or 2 with the proviso that when x is 1 then y is 2, and when x is 2 then y is 1, to produce a predominantly carbonylated intermediate polymer, and in a second stage, reacting said intermediate polymer with hydrogen and from 10 to 500 p.s.i.g. partial pressure of CO in the presence of a catalyst as set forth as (5) and (6) above, and recovering the resulting hydroxylated polymer. This method is set forth more fully in copending application Ser. No. 307,359 of Cull, Mertzweiller and Tenney, filed Sept. 9, 1963.

It has been found that the improvements in flexibility and adhesion as measured by reverse impact and mandrel flexibility can be obtained by blending only relatively minor amounts of the hydroformylated polymer with the oxidized polymeric material. It is usually suitable to use at least 5 wt. percent hydroformylated polymer in the composition, the maximum amount of hydroformylated polymer employed being 30 wt. percent, both values based upon the total composition. Preferably, the blends will contain from 10 to 25 wt. percent of hydroformylated polymer in the composition.

Blending of the oxidized polymer with the hydroformylated polymer can be accomplished by mixing solutions of the polymers in a vessel provided with means for agitation or the like, the mixing of the materials being continued until a homogeneous composition is obtained. If desired, the polymer blend can be recovered by precipitating it from solution by cooling, or the solvent employed can be vaporized. When proceeding in this manner, the solutions used can advantageously be the same ones employed in the process for preparing the polymers. Optionally, minor amounts of pigments, dyes, or fillers, can be admixed with the oxidized and/or hydroformylated polymers prior to or during the blending operation.

As has been indicated, particularly useful blends are prepared when high oxygen content oxidized butadiene polymers are used, that is, polymers containing over 16% oxygen, e.g. about 16 to 30% oxygen, in combination with the hydroxylated polybutadiene or polybutadiene-styrene copolymers. It has been found, however, that with lower oxygen content oxidized butadiene polymers (10–16%), solutions of each polymer component are initially clear, but turbidity subsequently results on mixing and the mixture separates into two layers on standing. In aspect, therefore, the present invention concerns itself with the objective of obtaining miscible solutions of said oxygen-containing polymeric components.

In accordance with the invention, it has been discovered that by blending said lower oxygen content oxidized butadiene polymers with the hydroxylated polybutadiene or polybutadiene-styrene copolymers and with certain oxygenated solvents at somewhat elevated temperatures, for example, 120 to 180° F. and preferably 120 to 140° F., a miscible solution can be obtained. The oxygenated solvents which must be employed include tetrapropenylsuccinic anhydride (hereinlater referred to as TPSA) or dodecene-oxide (DDO). Surprisingly, it has also been discovered that by adding dimethyl sulfoxide (DMSO) to the TPSA-containing mixture, a clear solution results at ambient temperatures, i.e., 68–80° F. Similarly, it has been found that DDO added to DMSO-containing mixtures impart similar effect, without heating, to blends of this invention. In accordance with the invention, 20 to 40 parts by weight of the oxygenated solvent are added to the blends to be treated, in order to overcome immiscibility with from 25 to 30 parts by weight being preferred. It is found that use of more than 20, but less than 25 parts by weight of oxygenated solvent will beneficially effect the miscibility, but not necessarily the clarity of the solution being treated.

All of the blended polymers hereinbefore referred to, however, are superior coating compositions suitable for application as air dried or baked films. Such compositions can be applied in the form of solutions in suitable organic solvents, for example, methyl isobutyl ketone, xylene, and the like or can be applied as a latex. The presence of the carbonyl and/or hydroxyl groups aid in good film adhesion to metal surfaces. Such films are also found to be very flexible in addition to being very tough and durable.

The following examples will better illustrate the nature of the present invention; however, the invention is not intended to be limited to these examples. Parts are by weight unless otherwise indicated.

*Example I*

The following example is illustrative of the preparation of the oxidized polymeric material utilized as starting material in the blends of this invention. In accordance with the procedure hereinbefore set forth, a butadiene-styrene copolymer was prepared from the following charge:

| | Parts |
|---|---|
| Butadiene-1,3 | 80 |
| Styrene | 20 |
| Varsol | 200 |
| Dioxane | 40 |
| Isopropanol | 0.2 |
| Sodium (10–50 micron dispersion) | 1.5 |

The polymerization of this charge was carried out at 50° C. with a mechanical agitator. Complete conversion was obtained in 4.5 hours. The catalyst was destroyed and removed from the resulting crude product and the product stripped to 98% N.V.M.

The polymeric oil thus obtained was dissolved in Solvesso–100 (an aromatic solvent R.R. 157–177° C. K.B. value 99–100) to give a solids content of 35%. The solution was then air blown using oxygen gas in a stirred reactor, at atmospheric pressure, 235–240° F. temperature with 100 p.p.m. manganese (manganese naphthenate) as catalyst. Approximately, 10 wt. percent oxygen (based on polymer) was introduced into the polymer. The resultant oxidized polymer was then filtered, stripped under reduced pressure to approximately 60% N.V.M. and the solids content adjusted to 50% by addition of Solvesso–100. Final product N.V.M. 50 wt. percent, $O_2$=10 wt. percent.

*Example II*

The following example illustrates the preparation of hydroxylated polymers similar to type within the scope of the instant invention.

A 300 cc. stirred autoclave was charged as follows: 130 gms. of 40% polybutadiene (ca. 2000 mol. wt.) in solution in xylene. 4.3 gms. of catalyst solution prepared by slurrying 20 gms. at $Co_2(CO_7)(P(C_4H_9)_3)_2$ in 100 gms. of n-hexane and heating at 395° F. for 35 minutes under 430–490 p.s.i.g. synthesis gas.

The autoclave was pressured cold to 600 p.s.i.g. with synthesis gas and heated to 350° F. The reaction was continued under these conditions while maintaining a flow of synthesis gas through the system to maintain constant $H_2/CO$ ratio (1/1). The flow was measured at about 0.5 liter/minute. After continuing the reaction for a total of 217 minutes a sample was withdrawn and analyzed by KOH numbers as follows:

Carbonyl No., mg. KOH/gm. polymer _____ 60
Hydroxyl No., mg. KOH/gm. polymer _____ 93

This corresponds to an estimated average of about 3 carbonyl (aldehyde) groups and 4 hydroxyl groups per polymer molecule.

The pressure (syn. gas) on the autoclave was reduced to 200 p.s.i.g. and then increased to 1730 p.s.i.g. with pure hydrogen. The temperature was simultaneously increased to 385° F. The initial gas absorption rate was about 100 lbs./minute which decreased to 1 lb./minute after 50 minutes at 1600–1700 p.s.i.g. and 385° F. The KOH numbers on the product were as follows:

Carbonyl No., mg. KOH/gm. _____ 0
Hydroxyl No., mg. KOH/gm. _____ 184

This corresponds to an average of about 8 primary hydroxyl groups/molecule. The infrared spectra showed that no type I unsaturation and only 46% of the original 30% type II unsaturation remained in the polymer.

*Example III*

The following example illustrates the preparation of a carbonylated diolefin polymer by the hydroformylation method as hereinbefore described. In accordance with this method a 30% solution (130 gm.) of Buton–150 (a commercial polybutadiene of approximately 1800 molecular weight, approximately 70% of its unsaturation is type I and 30% is type II) in toluene was mixed with 1.4 gms. of catalyst comprising the triethyl phosphite bridged complex of dicobalt octacarbonyl, $$[(Co)_2(CO)_6P(OC_2H_5)_3)_2]$$

and the solution treated under hydroformylation conditions at 300° F. and 1200 p.s.i.g. of synthesis gas (1/1 $H_2/CO$) for two hours. The infrared spectrum of the resulting product solution showed strong bands at 5.75 microns (non-conjugated C=O), 5.85 microns (conjugated C=O) approximately 10.0 and 11.0 microns (type I olefins, pendant vinyl groups) and 10.3 microns (type II, trans internal olefin).

*Example IV*

In order to illustrate the improvements in flexibility and adhesion issuing from the invention a number of blends of oxidized polybutadiene and hydroxylated polybutadiene were prepared in a manner similar to the foregoing and films of the resulting blends were cast on D panels. Data obtained are summarized below.

| Blend | Percent A | Percent B | Film Properties [1] | | | |
|---|---|---|---|---|---|---|
| | | | Thickness, mils | Pencil Hardness | Mandrel Flexibility | Reverse Impact, in./lb. |
| 1 | 100 | 0 | 0.85 | 7H | p¼ | 8 |
| 2 | 95 | 5 | 0.85 | 7H | p⅛ | 18 |
| 3 | 80 | 20 | 0.90 | 7H | p⅛ | 22 |

[1] Films cured 30 minutes at 350° F. D panels used.
Resin A—Oxidized polybutadiene N.V.M. 32.0, oxygen 29.8.
Resin B—Hydroxylated polybutadiene N.V.M. 50%, oxygen 7.0, carbonyl No. 9, hydroxyl No. 237.

The above data show that improvements in flexibility and adhesion as measured by reverse impact and mandrel flexibility can be obtained by adding hydroxylated polybutadiene to oxidized polybutadiene. Further, this effect is more marked when the oxygen content of the oxidized polybutadiene is higher. (The higher the oxygen level, the more brittle the resulting film, hence the greater the effect of the hydroxylated polymer on ultimate film properties.)

*Example V*

In a manner samilar to that of Example IV, a series of test panels (Q panels) were coated with blends of the oxidized polybutadiene (PBD) (30% oxygen) and hydroxylated polybutadiene (HPBD). Data are given in the following tabulation. Films were cured by baking 25 minutes at 370° F.

| Blend | Percent Oxidized PBD | Percent HPBD | Film Properties | | |
|---|---|---|---|---|---|
| | | | Thickness, mils | Pencil Hardness | Reverse Impact, in./lbs. |
| 1 | 100 | 0 | 0.7 | >8H | 50 |
| 2 | 95 | 5 | 0.6 | >8H | 70 |
| 3 | 90 | 10 | 0.6 | >8H | 70 |
| 4 | 80 | 20 | 0.7 | >8H | >80 |

The resulting data clearly illustrates the same trends in the film properties on the Q panels as were evidenced on the D panels of Example IV.

Example VI

The following examples illustrate the use of carbonylated polymers in the blends of this invention. In order to accomplish this, blends of carbonylated Buton having the following physical properties: N.V.M. 52%, $O_2$=5-6%, Co=0.14 wt. percent, Buton-200 having the properties, N.V.M. 50%, $O_2$=10% and oxidized polybutadiene having the properties: N.V.M. 46.6%, $O_2$=10.6 wt. percent were prepared, films were drawn on D panels and cured for 30 minutes @ 370° F. The following data were obtained.

noted that addition of only 20–30 weight percent of carbonylated Buton in blends 5 and 6 improves the physical properties of the total blend to nearly approach the physical properties of the single carbonylated component added.

Example VII

Blends of oxidized polybutadiene (OXPBD) (N.V.M. 37.7%, $O_2$ 23%) and hydroxylated polybutadiene (HPBD) (N.V.M. 40%, $O_2$ 5.6) were prepared. Films were drawn on D panels and baked 30 minutes @ 350° F. Data are tabulated below.

| Sample | Wt. Percent | | Solvent | Film | | |
|---|---|---|---|---|---|---|
| | OXPBD | HPBD | | Thickness | Hardness | Flex. |
| 1 | 100 | 0 | Solvesso | 0.95 | 3H | p⅛ |
| 3 | 75 | 25 | do | 0.96 | 3H | p⅛ |
| 4 | 25 | 75 | do | 0.88 | 2H | p⅛ |
| 5 | 0 | 100 | do | 0.90 | 2H | p⅛ |

The above data show that adding up to 25% HPBD to oxidized polybutadiene resulted in improvement in mandrel flexibility with no sacrifice in hardness.

Example VIII

The following example serves to illustrate the effect that certain oxygenated solvents have on the problem of immiscibility.

A blend (45/55) of Buton–200 (oxidized polybutadiene-styrene copolymer 10% oxygen) and hydroxylated Buton–150 (polybutadiene) (6% oxygen, 40% N.V.M.) was prepared. Although both solutions were clear, turbidity resulted on mixing. The mixture separated into two layers on standing. Several oxygenated solvents were added in an attempt to obtain a miscible solution. Among the

| Blend | Resin A | Resin B | Resin C | Thickness, mils | Pencil Hardness | Mandrel Flex. | R.I., in./lb. |
|---|---|---|---|---|---|---|---|
| 1 | 100 | 0 | 0 | 1.1 | 5H | p½ | 10 |
| 2 | 90 | 0 | 10 | 1.0 | 4H | p½ | 14 |
| 3 | 80 | 0 | 20 | 1.0 | 4H | p½ | 16 |
| 4 | 70 | 0 | 30 | 1.0 | 4H | p½ | 18 |
| 5 | 0 | 80 | 20 | 1.2 | 3H | p⅛ | 40 |
| 6 | 0 | 70 | 30 | 1.2 | H | p⅛ | 40 |
| 7 | 0 | 0 | 100 | 1.0 | 4H | p⅛ | 40 |
| 8 | 0 | 100 | 0 | 1.0 | 5H | p½ | 30 |

Resin A—Buton-200
Resin B—Ox Polybutadiene
Resin C—Carbonylated Buton

These data show that addition of carbonylated Buton to both Buton–200 and oxidized polybutadiene results in improvement in flexibility and adhesion. It should also be solvents tried were dioxane, methylisobutylketone, butyrolactone, ethyl acetate, butanol, dimethyl sulfoxide and tetrapropenyl succinic anhydride. All showed the same phenomenon; i.e., immiscibility on mixing. The TPSA Buton–200-hydroxylated Buton mixture became clear on heating. By adding DMSO to the TPSA mixture, a clear solution even at room temperature resulted. Dodeceneoxide, dimethyl sulfoxide blends gave similar results.

A series of samples were prepared as indicated below:

| Sample | Polymer, Wt. percent on Solution | | Addition, Wt. percent | | | Remarks |
|---|---|---|---|---|---|---|
| | Buton-200 | Hydroxylated Buton-150 | TPSA | DDO | DMSO | |
| 1 | 20 | 24 | 10 | | 10 | Cloudy. |
|   | 20 | 24 | 10 | | 15 | Clear. |
|   | 20 | 24 | 10 | | 20 | Do. |
| 2 | 20 | 24 | 20 | | 10 | Do. |
|   | 20 | 24 | 20 | | 20 | Do. |
| 3 | 20 | 24 | | 10 | 10 | Cloudy. |
|   | 20 | 24 | | 10 | 15 | Clear. |

DDO—dodecene oxide.
TPSA—tetrapropenylsuccinic anhydride.
DMSO—dimethyl sulfoxide.

The above example shows that approximately 45/55 blends of Buton–200 and hydroxylated Buton–150 are incompatible and that a combination of either TPSA or DDO with dimethyl sulfoxide acts as a mutual solubilizer. Films drawn from these solvents were slightly softer (2H vs. 4H) than Buton–200 controls, but showed excellent flexibility and adhesion to tin plate.

What is claimed is:

1. A composition comprising from about 70 to 95 parts by weight of an oxidized polymer containing 10% to 30% of oxygen by weight selected from the group consisting of polybutadiene and polybutadiene copolymers and from about 5 to 30 parts by weight of a hydroformylated polymer chosen from the group consisting of polybutadiene and polybutadiene copolymers.

2. The composition of claim 1 in which both of the polybutadiene copolymers are copolymers of butadiene with a vinyl aromatic hydrocarbon.

3. The composition of claim 1 in which the oxidized polymer is employed in amounts of 75 to 90 parts by weight and the hydroformylated polymer is employed in amounts of 10 to 25 parts by weight.

4. A composition of matter comprising from about 70 to 95 parts by weight of an oxidized polymer containing 10% to 30% of oxygen by weight selected from the group consisting of polybutadiene and polybutadiene-styrene copolymers and from about 5 to 30 parts by weight of a hydroformylated polymer chosen from the group consisting of polybutadiene and polybutadiene-styrene copolymers.

5. The composition of claim 4 in which the hydroformylated polymer is hydroxylated polybutadiene.

6. A blended composition consisting essentially of from about 45 to 95 parts by weight of an oxidized polymer selected from the group consisting of polybutadiene and polybutadiene copolymers, said oxidized polymer containing about 10 percent oxygen, from about 5 to 30 parts by weight of a hydroxylated polymer selected from the group consisting of polybutadiene and polybutadiene copolymers and from 20 to 40 parts by weight of an oxygenated solvent selected from the group consisting of tetrapropenylsuccinic anhydride and dodecene oxide.

7. The composition of claim 6 in which the oxygenated solvent comprises a mixture of one of the members of said group consisting of tetrapropenylsuccinic anhydride and dodecene oxide with dimethyl sulfoxide.

8. The composition of claim 6 in which from 10 to 30 parts by weight of the oxygenated solvent is employed.

9. A process for producing a blended oxidized butadiene polymer having improved adhesion and flexibility which comprises blending at between 120° F. to 180° F. about 45–95 parts by weight of an oxidized polymer selected from the group consisting of polybutadiene and polybutadiene copolymers, said oxidized polymer containing about 10% oxygen, about 5 to 30 parts by weight of a hydroxylated polymer selected from the group consisting of polybutadiene and polybutadiene copolymers and 20 to 40 parts by weight of an oxygenated solvent selected from the group consisting of tetrapropenylsuccinic anhydride and dodecene oxide.

10. The process of claim 9 in which both butadiene copolymers are copolymers of butadiene with vinyl aromatic hydrocarbons.

11. The process of claim 9 which utilizes about 45 wt. percent oxidized polymer and about 55 wt. percent hydroxylated polymer.

12. The process of claim 9 which utilizes about 25 to 30 parts of oxygenated solvent.

References Cited
UNITED STATES PATENTS

| | | | |
|---|---|---|---|
| 2,890,191 | 6/1959 | Edmonds | 260—894 |
| 3,036,025 | 5/1962 | Hutchinson. | |
| 3,231,621 | 1/1966 | Slaugh | 260—604 |

MORRIS LIEBMAN, *Primary Examiner.*

J. FROME, *Assistant Examiner.*